United States Patent

Donahue et al.

[11] 3,824,658
[45] July 23, 1974

[54] METHOD OF FABRICATING A BEARING ASSEMBLY

[75] Inventors: Jerome T. Donahue, Oconomowoc, Wis.; Walter F. Hess, Deerfield, Ill.; Gordon W. Knoebel, Madison; Donald E. Sydow, Oconomowoc, both of Wis.

[73] Assignee: Oconomowoc Mfg. Corp., Oconomowoc, Wis.

[22] Filed: Apr. 19, 1973

[21] Appl. No.: 352,838

[52] U.S. Cl. ............................ 29/148.4 A, 308/190
[51] Int. Cl. ........................ B23p 11/00, F16c 33/00
[58] Field of Search ................. 308/190; 29/148.4 A

[56] References Cited
UNITED STATES PATENTS

| 3,089,221 | 5/1963 | Barr | 308/190 |
| 3,097,898 | 7/1963 | Ferdig | 308/190 |
| 3,469,892 | 9/1969 | Langstroth | 308/190 |

FOREIGN PATENTS OR APPLICATIONS

| 1,092,766 | 11/1954 | France | 308/7 |

*Primary Examiner*—Charles J. Myhre
*Assistant Examiner*—Frank Susko
*Attorney, Agent, or Firm*—Wheeler, Morsell, House & Fuller

[57] ABSTRACT

A bearing and roller assembly having a unitary inner race which is grooved on its outer periphery to receive a plurality of bearing balls. A unitary, resilient outer race is dimensioned on its inner periphery to receive the bearing balls and to fit over the inner race with one axial end of the outer race being spaced from the corresponding axial end of the inner race by a distance which is smaller than the diameter of the bearing balls but large enough to permit the bearing balls to be forced therethrough. In assembling the bearing, the balls are positioned adjacent to the space between the axial ends of the inner and outer races and are forced by a hydraulically powered plunger into the space between the two races. The outer race deforms elastically as the balls are forced past its axial end and then snaps back to its original dimensions to hold the balls in place between the two races.

5 Claims, 4 Drawing Figures

PATENTED JUL 23 1974　　　　　　　　　　　　　　　3,824,658

3,824,658

METHOD OF FABRICATING A BEARING ASSEMBLY

BACKGROUND OF THE INVENTION

This invention relates to bearing and roller assemblies for rollably suspending file cabinet drawers, kitchen drawers, shower doors, and the like. Prior bearing and roller assemblies designed for this use are disclosed in U.S. Pat. No. 3,469,892, which was issued on Sept. 30, 1969 to H. Langstroth, and in our copending application Ser. No. 326,903 which was filed on Jan. 26, 1973 for a "Bearing and Roller Assembly."

As disclosed in the above-noted patent and copending application, prior bearing and roller assemblies may have a unitary, cylindrically shaped inner race which does not constrain sideways movement of the bearing balls but rather permits it. In the structure shown in the patent, this sideways movement is limited on one side by an inwardly extending portion of the outer race and on the other side by a circular disc swaged to one axial end of the inner race. But the fact that the bearing balls are free to move sideways makes the bearing loose in its axial dimension. Moreover, when the bearing balls are moved sideways, they rub against the end disc and this increases the friction of the bearing and also scruffs the balls. Accordingly, it is desirable to provide a bearing and roller assembly in which the balls are constrained from sideways movement by being engaged in a ball groove in the inner race.

However, in the prior art, grooved inner races typically require that either the inner or the outer race be split along their central plane into two halves which are held together mechanically. This is relatively expensive and moreover, is not as economically practical in the smaller size bearing and roller assemblies.

Accordingly, one object of this invention is to provide a bearing and roller assembly having a unitary grooved inner race and a unitary outer race.

Another object of this invention is to provide a method by which a bearing and roller assembly having a unitary grooved inner race and a unitary outer race may be fabricated.

Other objects and advantages of the invention will be apparent to those skilled in the art from the following description of one illustrative embodiment thereof.

SUMMARY OF THE INVENTION

In accordance with this invention, the above-noted objects are attained by providing a bearing and roller assembly having a grooved unitary inner race and a resilient unitary outer race which is dimensioned to fit over the inner race with one axial end of the outer race being spaced from the corresponding axial end of the inner race by a distance which is smaller than the diameter of the bearing balls but large enough to permit the bearing balls to be forced therethrough. In assembling the bearing, the balls are positioned adjacent to the space between the axial ends of the inner and outer races and are forced by a suitable plunger into the space between the two races. The outer race deforms elastically as the balls are forced past its axial end and then snaps back to its original dimensions to hold the balls in place between the two races.

DESCRIPTION OF THE PREFERRRED EMBODIMENT

Although the disclosure hereof is detailed and exact to enable those skilled in the art to practice the invention, the physical embodiments herein disclosed merely exemplify the invention which may be embodied in other spedific structure. The scope of the invention is defined in the claims appended hereto.

Figure 1:
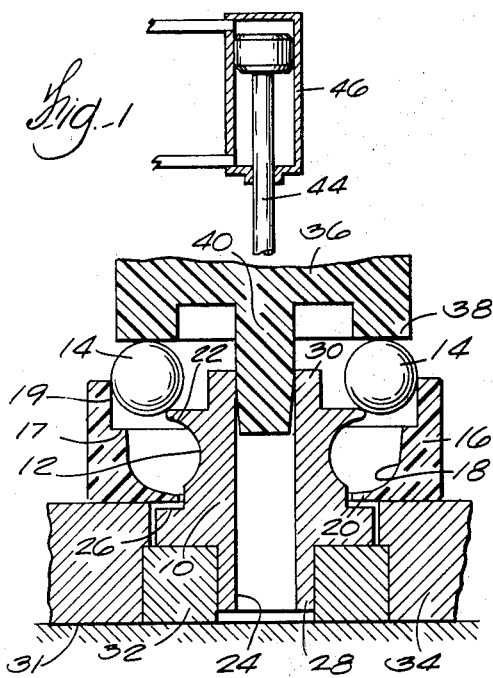
FIG. 1 is an enlarged axial sectional view showing an inner race, an outer race, and a plurality of bearing balls positioned to be forced between the inner and outer races.
Figure 2:
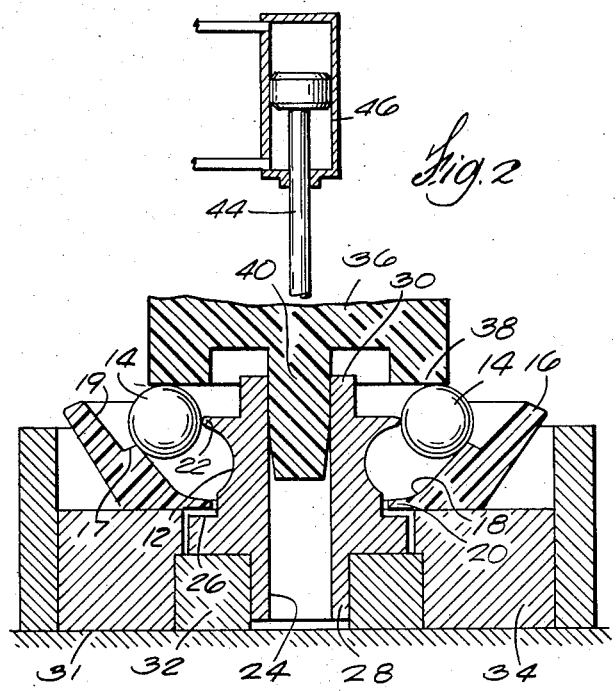
FIG. 2 is an enlarged axial sectional view similar to FIG. 1 showing the bearing balls being forced past the axial end of the outer race, the latter being elastically deformed by the pressure applied thereto through the bearing balls.
Figure 3:
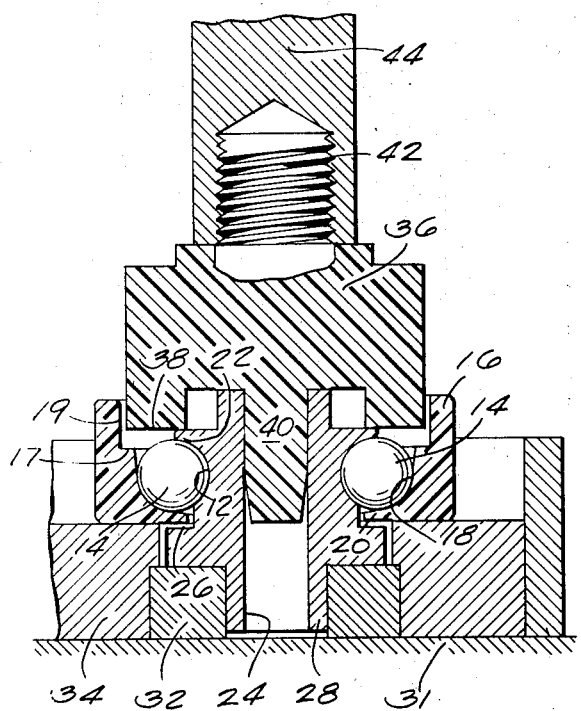
FIG. 3 is an enlarged axial sectional view similar to FIGS. 1 and 2 showing the bearing balls forced into position between the two races with the outer race having snapped back from the elastically deformed position shown in FIG. 2.

FIGS. 1, 2 and 3 show one illustrative bearing and roller assembly of this invention being fabricated by the method of this invention. The drawings are scaled to approximately three times the actual size of one embodiment of the parts for clarity of illustration. Referring to FIG. 1, a unitary inner annular race 10 is provided having a ball groove 12 around its outer periphery for receiving a plurality of bearing balls 14 which are typically made of steel. A unitary outer annular race 16 is positioned over inner race 10 and has a curved inner face 18 that extends inwardly at 20 to provide a thrust shoulder for the bearing balls 14 as will be explained hereinafter. The outer race 16 may be made of any suitable resilient material but in this embodiment is preferably made of nylon or a similar resilient plastic material. It should be understood, however, that this invention is not limited to plastic outer races since any material which can be elastically deformed by the required amount may be used for the outer race.

The inner race 12 has a radially extending thrust shoulder 22 at one axial end of the grooved surface 12. The adjacent axial end of the outer race 16 is spaced from shoulder 22 by a distance which is smaller than the diameter of bearing balls 14 but which is large enough to permit the bearing balls 14 to be forced therethrough. The exact spacing employed in any given embodiment depends upon the material used for outer race 16 and on the configuration and dimensions of outer race 16. Inasmuch as these factors are variable, no fixed dimension can be given for the spacing, but the spacing required in any given embodiment can be easily determined by those skilled in the art by well known prior art techniques. In general, the spacing should be large enough so that balls 14 can be forced past the axial end of both races without exceeding the limits of elastic deformation for the outer race 16. In the case of plastic material such as nylon, the limits of elastic deformation may be extended by heating the outer race 16 and moisturizing it immediately before the balls 14 are forced into place. This permits a smaller spacing to be used between the axial ends of the two races and provides a larger thrust shoulder 22 for bearing balls 14. The preferred temperature range and moisture content will be described hereinafter in connection with the method of this invention.

Outer race 16 has an axial shoulder 17 and a recessed portion 19 that provides clearance for balls 14. With this configuration, the distance between shoulder 17 and thrust shoulder 22 should be smaller than the diameter of balls 14 but large enough so that the balls 14 can be forced past the shoulders 17 and 22 as shown in FIG. 2 without exceeding the limits of elastic deformation of outer race 16. As noted above, the exact spacing required to produce this result varies in accordance with the material used for outer race 16, its dimensions, temperature, moisture content, and any other factors that effect the limits of elastic deformation. With a nylon outer race 16 having approximately one-third the dimensions shown in the drawings, with bearing balls 14 having a diameter of 1/8 inch, the temperature of the nylon outer race 16 being between 150° and 215° F., and the relative humidity of the nylon outer race 16 being between 40 and 75 percent, a spacing of 3/32 inches was found to be adequate for the spacing between the two shoulders 17 and 22.

In this particular embodiment, the inner race 10 has a central bore or opening 24 therethrough. A radial shoulder 26 and axially extending end sleeve portions 28 and 30 project from opposite axial ends of inner race for performing fastening functions as will be described hereinafter.

In the method of this invention, the inner race 10, typically metal, is supported upon an anvil 32 which in turn is supported upon a base 31, such as an assembly table. The outer race 16 is supported by an assembly pod 34 (see FIG. 2) which is also bottomed on base 31 and which fits around anvil 32 and holds outer race 16 in spaced position around inner race 10. Both races are supported with their axes extending vertically. The thrust shoulder 22 of inner race 10 is in the uppermost position and the thrust shoulder 20 of outer race 16 is in the lowermost position, as illustrated in FIGS. 1-3 inclusive.

In cases where nylon is used for the outer race 16, it is preferable to soak the race 16 in boiling water before placing it on assembly pod 34 long enough to raise its temperature to between 150° and 215° F. and to raise its relative moisture content to between 40 and 75 percent relative humidity. This enhances the elastic deformability of the outer race 16 and allows it to be deformed further without cracking.

The bearing balls 14 are placed in the space between the upper axial ends of inner race 10 and outer race 16 as shown in FIG. 1. A plunger or inserter 36 which has an annular face 38 is guided into position above the balls 14 by a tapered pilot pin 40 which telescopically enters the central opening 24 in inner race 10. The annular face 38 is positioned directly above balls 14 and is preferably made of Delrin plastic or some other suitable plastic material to provide a yieldable surface that will not scar or scruff the balls 14 as it forces them downward between the races 10 and 16. The plunger or inserter 36 is attached by means of screw threads 42 (see FIG. 3) to a piston rod 44 that projects from one end of a double acting hydraulic cylinder 46 (see FIG. 1). When the inner race 10, outer race 16, and balls 14 are positioned as shown in FIG. 1, hydraulic cylinder 46 is actuated by suitable prior art control means to force the balls 14 downward into the space between races 10 and 16 as shown in FIGS. 2 and 3.

As the balls 14 move downward between shoulders 17 and 22, the outer race 16 is deformed elastically as shown in FIG. 2 and then snaps back to its original shape after the balls 14 have cleared shoulders 17 and 22 and entered the space between the two races as shown in FIG. 3. The amount of deformation of outer race 16 is exaggerated in FIG. 2 for illustration purposes. In practice, the deformation is considerably less. In all cases, the amount of deformation is within the limits of elastic deformation for the material involved so that the outer race 16 will spring back to its original dimensions when the balls 14 are in place and thus act to hold the balls 14 in place.

At the end of the downward stroke of plunger 36, the annular face 38 of plunger 36 abuts against the edge of shoulder 22 (see FIG. 3) and thus limits the downward movement of plunger 36. This is not an essential feature of the method of this invention but it is preferable. After plunger 36 reaches the position shown in FIG. 3, the hydraulic cylinder 46 is actuated in the opposite direction to draw the plunger 36 upward clear of the bearing assembly so that it can be removed from anvil 32 and assembly pod 34. At this point, the bearing assembly is capable of being used without any further supporting structure. However, in order to enhance the strength of the bearing assembly and to keep dirt and dust from entering the space between the races 10 and 16, it is preferable to swage a circular metal washer-shaped disc 48 to the axially extending end portion 30 of inner race 10 (see FIG. 4). The entire assembly can then be attached to a bracket 50 for supporting a drawer or the like by swaging the axially extending sleeve portion 28 around an opening 51 in the bracket 50. The bracket 50 is then rollably supported by the bearing and roller assembly upon a suitable track or rail 52.

Figure 4:
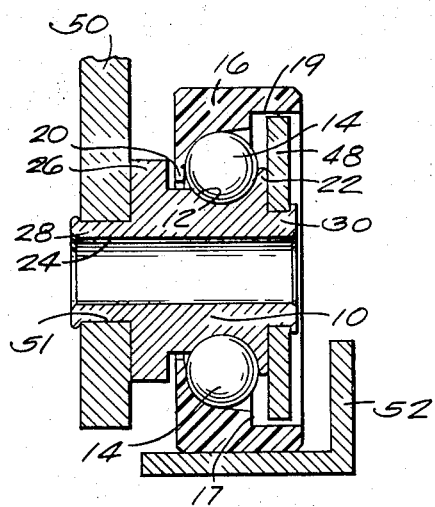
FIG. 4 is an enlarged axial sectional view of a finished bearing and roller assembly attached to a bracket and rollably supported by a track.

With reference to FIG. 4, it should be noted that the ball groove 12 in inner race 10 prevents sideways movement of the balls in either axial direction. It should also be noted that outer race 16 is constrained from axial movement in either direction in FIG. 4 by thrust shoulder 22 and balls 14. Since the outer face of a round rolling surface can only touch at one point while it is rolling, the creation of a portion of a ball groove in the outer race 16 gives positive ball bearing action in both directions of axial thrust. Thus, the bearing and roller assembly of this invention has relatively little axial play and can withstand extremely large axial forces without malfunctioning, which is an important feature in bearings of this type. Moreover, this desirable result is achieved without the complication of a split race such as was required in prior art devices to achieve the same end.

We claim:

1. A method of fabricating a bearing assembly comprising the steps of providing a unitary annular inner race having a groove in the outer periphery thereof for receiving a plurality of bearing balls, providing a plurality of bearing balls each having the same diameter, providing a unitary, resilient, annular outer race which is dimensioned to fit over said inner race with one axial end of the outer race being spaced from the corresponding axial end of the inner race by a distance which is smaller than the diameter of said bearing balls but large enough to permit said balls to be forced through said space without exceeding the limits of elastic deformation of said resilient outer race, heating and moisturizing said outer race to increase its limits of elastic deformation, placing said outer race over said inner race, placing said bearing balls adjacent to the axially spaced ends of said inner and outer races, and applying an axially directed force to said bearing balls to force them into the space between said inner and outer races, said resilient outer race being elastically deformed in response to said axially directed force to admit said bearing balls into the space between said races and then snapping back to its original dimensions to hold said bearing balls in the space between said races.

2. The method of claim 1 in which said outer race is made of nylon and wherein said outer race is heated to a temperature within the range of 150° to 215° F. and is moisturized to a relative humidity within the range of 40 to 75 percent.

3. The method of claim 1 wherein said inner and outer races are supported with their axes extending vertically during said fabrication process.

4. The method defined in claim 1 and further comprising the step of attaching a disc to the first mentioned axial end of said inner race to cover the space between said inner race and outer race.

5. The method defined in claim 1 wherein said axial force is applied to said bearing balls by an annular plunger having a yieldable face to avoid scarring or scruffing the surface of the balls when they are forced into the space between the two races.

* * * * *